United States Patent
Lee et al.

(10) Patent No.: US 7,783,155 B2
(45) Date of Patent: Aug. 24, 2010

(54) METHOD AND SYSTEM FOR DETECTING WEAK OR INVALID SIGNALS IN DATA STREAMS

(75) Inventors: Janghwan Lee, Westfield, IN (US); Charles William Worrell, Carmel, IN (US)

(73) Assignee: Thomson Licensing, Billancourt (FR)

( * ) Notice: Subject to any disclaimer, the term of this patent is extended or adjusted under 35 U.S.C. 154(b) by 1112 days.

(21) Appl. No.: 10/565,027

(22) PCT Filed: Mar. 25, 2004

(86) PCT No.: PCT/US2004/009176
§ 371 (c)(1),
(2), (4) Date: Jun. 8, 2006

(87) PCT Pub. No.: WO2005/018230
PCT Pub. Date: Feb. 24, 2005

(65) Prior Publication Data
US 2006/0233244 A1    Oct. 19, 2006

Related U.S. Application Data

(60) Provisional application No. 60/488,908, filed on Jul. 21, 2003.

(51) Int. Cl.
*H04N 5/76* (2006.01)
*H04N 7/26* (2006.01)

(52) U.S. Cl. .......................................... 386/68; 386/109
(58) Field of Classification Search .................. 386/1, 386/45–46, 68–69, 109–110
See application file for complete search history.

(56) References Cited

U.S. PATENT DOCUMENTS

| 5,565,921 | A  | 10/1996 | Sasaki et al. |
| 5,982,830 | A  | 11/1999 | Maturi et al. |
| 2002/0064369 | A1 | 5/2002 | McKee et al. |

FOREIGN PATENT DOCUMENTS

| EP | 1 148 729 A1 | 10/2001 |
| EP | 1 289 306 A2 | 3/2003 |

OTHER PUBLICATIONS

Search Report dated Jul. 30, 2004.

*Primary Examiner*—Thai Tran
*Assistant Examiner*—Nigar Chowdhury
(74) *Attorney, Agent, or Firm*—Robert D. Shedd; Robert B. Levy; Wan Yee Cheung

(57) ABSTRACT

There is provided a method for detecting signal conditions for Motion Picture Experts Group (MPEG) streams. Alternate-mode flags and valid frames within the MPEG streams are detected within a pre-defined search window. An indication that a valid signal is detected is output, when an alternate-mode flag and at least one valid frame are both detected within a same one of the predefined search window.

24 Claims, 3 Drawing Sheets

METHOD AND SYSTEM FOR DETECTING WEAK OR INVALID SIGNALS IN DATA STREAMS

CROSS-REFERENCE TO RELATED APPLICATIONS

This application claims the benefit, under 35 U.S.C. §365 of International Application PCT/US2004/009176, filed Mar. 25, 2004, which was published in accordance with PCT Article 21(2) on Feb. 21, 2005, in English and which claims the benefit of U.S. provisional patent application No. 60/488,908, filed Jul. 21, 2003.

BACKGROUND OF THE INVENTION

Field of the Invention

The present invention generally relates to data streams and, more particularly, to a methods and apparatus for detecting weak or invalid signals in data streams.

BACKGROUND OF THE INVENTION

Generally, different modes of video stream data can include dummy or auxiliary frames between valid frames that disrupt previously known methods for detecting weak or invalid signals. Typically, prior art detection techniques compare a valid video frame to a current input frame to detect a weak or invalid frame. A typical prior detection apparatus will count weak or invalid frames. When this count exceeds a set threshold, a weak signal event will be generated and a receiving device can respond accordingly. However, this approach yields false positive weak signal events on data streams that include dummy or auxiliary data.

For example, some encoders can add dummy frames only and manage the time stamps for that new timing, so that the decoder detects a current dummy frame as a frame that is to be skipped and the decoder repeats the display of the old (previous) frame. In such a case, the dummy frame should be easily detected by monitoring the trick mode flag in the Packetized Elementary Stream (PES) header. However, some encoders insert a discontinuity for managing their time stamps or use a different way to encode the trick mode stream, so that the corresponding decoders will not decode the stream as desired.

Accordingly, there exists a need for a method and apparatus for detecting a weak signal in trick mode operations that overcomes the above-identified problems of the prior art.

SUMMARY OF THE INVENTION

The problems stated above, as well as other related problems of the prior art, are solved by the present invention, which is directed to a method and apparatus for detecting weak signal conditions for compressed information streams, such as trick mode MPEG streams.

According to an aspect of the present invention, there is provided a method for detecting signal conditions for compressed information streams having both alternate mode conditions and valid frames. The method commences by detecting the alternate-mode conditions and valid frames within the compressed information stream within a pre-defined search window. An indication that a valid signal is detected is output, when an alternate-mode condition and at least one valid frame are both detected within a same one of the predefined search window.

These and other aspects, features and advantages of the present invention will become apparent from the following detailed description of preferred embodiments, which is to be read in connection with the accompanying drawings.

DETAILED DESCRIPTION

The present invention is directed to a method and apparatus for detecting weak signal conditions for compressed information streams, and more particularly, trick mode MPEG streams.

For illustrative purposes, a brief description will now be given of the present invention with respect to trick mode operation in Motion Picture Experts Group (MPEG) streams. However, it is to be appreciated that the present invention is not limited to trick mode operation or MPEG streams.

With respect to trick mode operation, a data stream will have one valid frame for a period along with some dummy frames and discontinuity settings. Thus, according to the present invention, a search window can be employed for detecting a valid frame, because there must be a valid signal present when a trick mode flag and a valid frame are both detected within the search window. Thus, the invalid frame can be counted as a valid frame within that window even though there is a decoding problem on that frame. Moreover, such an approach can also be employed to detect a weak signal condition or no signal condition because the trick mode flag is lost or a valid frame will not exist for a particular time period relating to a bad signal condition.

It is to be understood that the present invention can be implemented in various forms of hardware, software, firmware, special purpose processors, or a combination thereof. Preferably, the present invention is implemented as a combination of hardware and software. Moreover, the software is preferably implemented as an application program tangibly embodied on a program storage device. The application program can be uploaded to, and executed by, a machine comprising any suitable architecture. Preferably, the machine is implemented on a computer platform having hardware such as one or more central processing units (CPU), a random access memory (RAM), and input/output (I/O) interface(s). The computer platform also includes an operating system and microinstruction code. The various processes and functions described herein can either be part of the microinstruction code or part of the application program (or a combination thereof) that is executed via the operating system. In addition, various other peripheral devices can be connected to the computer platform such as an additional data storage device and a printing device.

It is to be further understood that, because some of the constituent system components and method steps depicted in the accompanying Figures are preferably implemented in software, the actual connections between the system components (or the process steps) can differ depending upon the manner in which the present invention is programmed. Given the teachings herein, one of ordinary skill in the related art will be able to contemplate these and similar implementations or configurations of the present invention.

Figure 4:
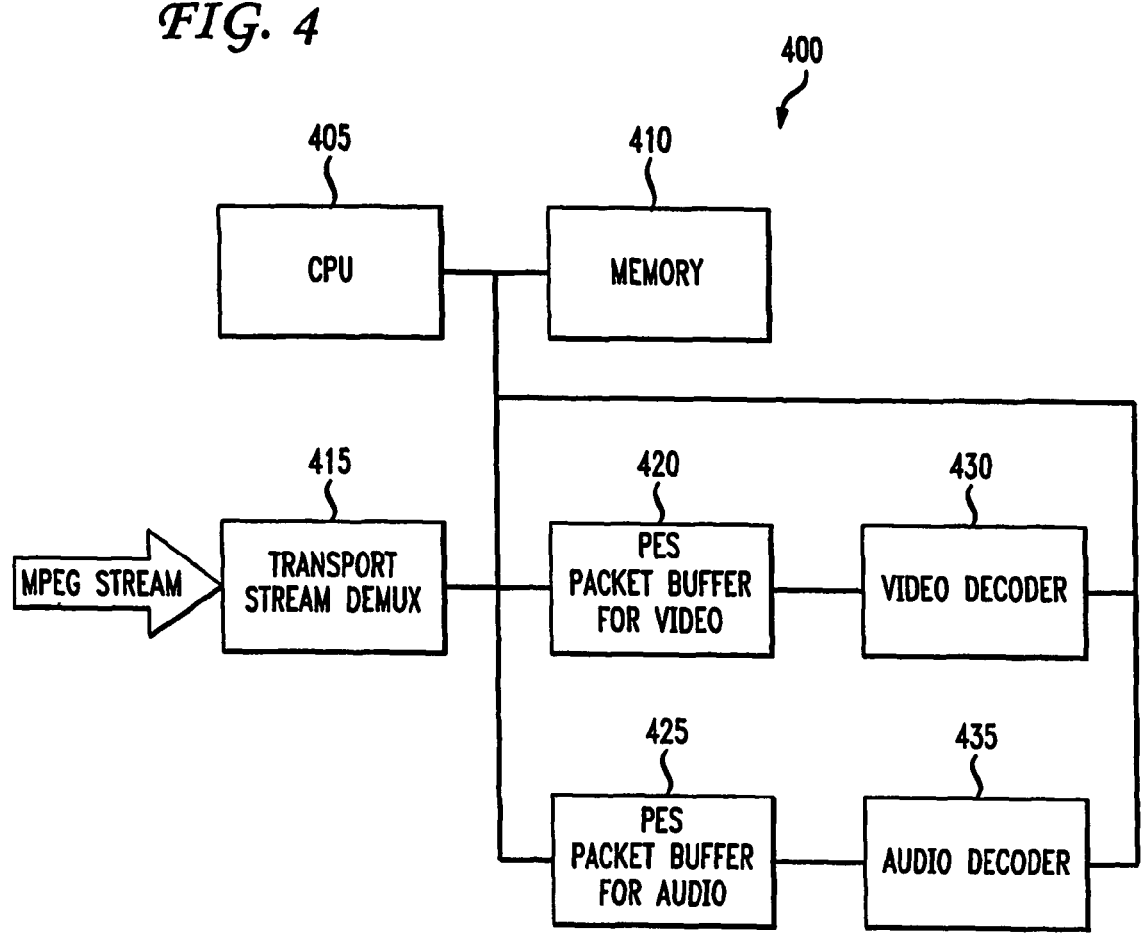
FIG. 4 is a block diagram illustrating an apparatus 400 for detecting weak signal conditions for trick mode operations of a Motion Picture Experts Group (MPEG) video stream, according to an illustrative embodiment of the present invention.

FIG. 4 is a block diagram illustrating an apparatus 400 for detecting weak signal conditions in a compressed information steam, and more particularly, for trick mode operations of a Motion Picture Experts Group (MPEG) video stream, according to an illustrative embodiment of the present invention. The apparatus 400 includes a central processing unit (CPU) 405, a memory device 410, a transport stream demultiplexer 415, a Packetized Elementary Stream (PES) buffer 420 for video, a PES packet buffer 425 for audio, a video decoder 430, and an audio decoder 435. It is to be appreciated that the present invention is not limited solely to the configuration and elements shown in FIG. 4 and, thus, other configuration and elements can be implemented therefore while maintaining the spirit of the present invention.

Figure 1:
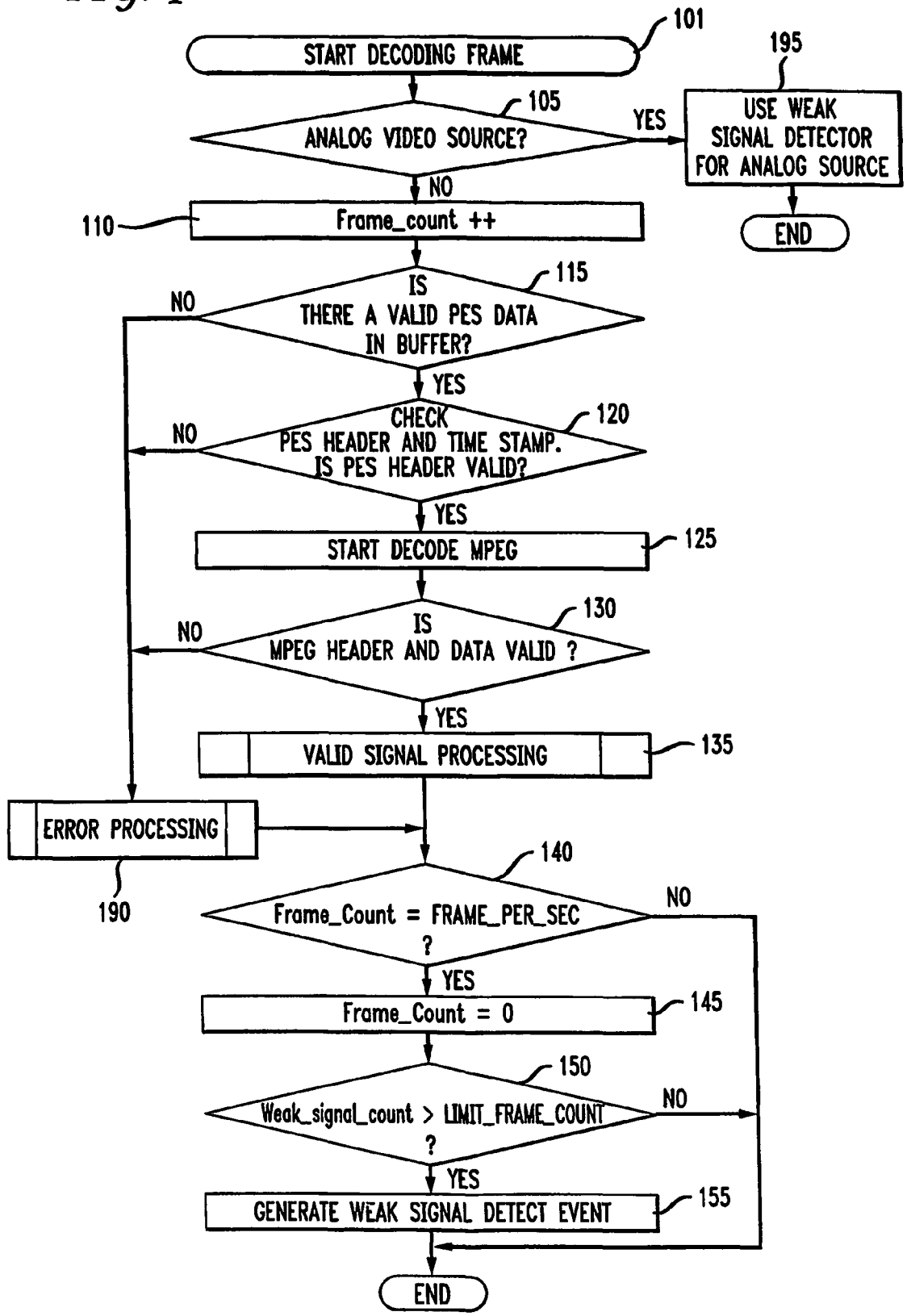
FIG. 1 is a flow chart illustrating a method for detecting a weak signal condition for trick mode operations of a Motion Picture Experts Group (MPEG) video stream, according to an illustrative embodiment of the present invention.
Figure 2:
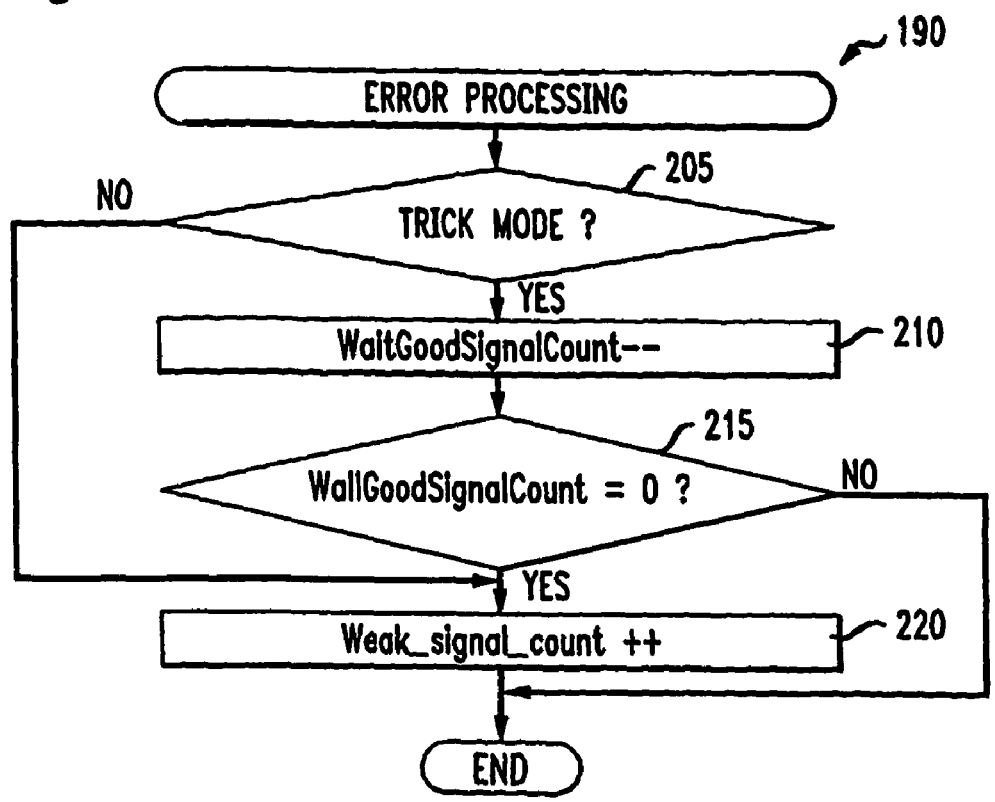
FIGS. 2 and 3 are flow charts further illustrating the method of FIG. 1, according to an illustrative embodiment of the present invention.
Figure 3:
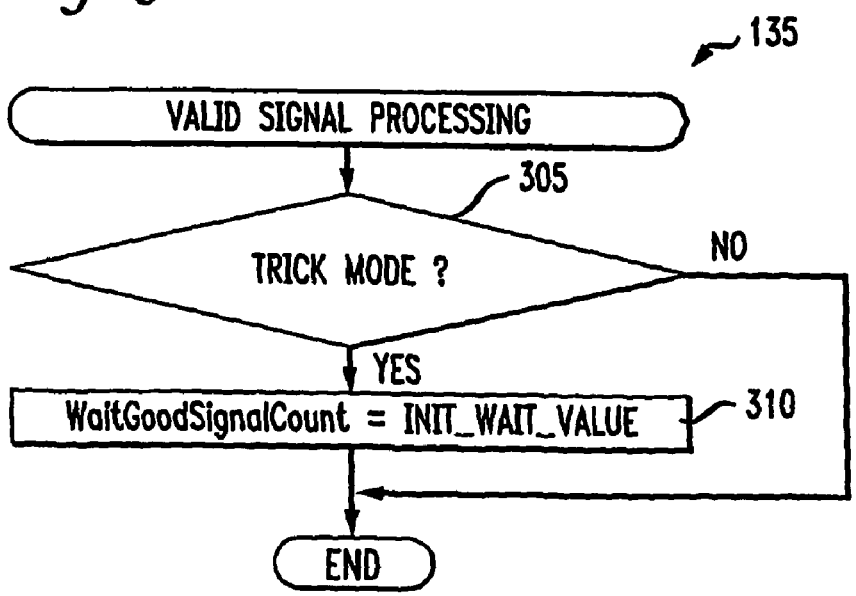

FIG. 1 is a flow chart illustrating a method for detecting a weak signal condition in a compressed information steam, and more particularly for trick mode operations of a Motion Picture Experts Group (MPEG) video stream, according to an illustrative embodiment of the present invention. FIGS. 2 and 3 are flow charts further illustrating the method of FIG. 1, according to an illustrative embodiment of the present invention. That is, FIGS. 2 and 3 are subroutines respectively relating to error processing and valid signal processing in the method/routine of FIG. 1.

Prior to commencing the method, all variables are set/reset to their initial values. Frame decoding commences with respect to a signal source during step 101. Step 101 is performed by the video decoder 430 and the audio decoder 435 of FIG. 4. The method of FIG. 1 is applicable to preferably implemented with respect to digital input sources, so if the input is analog, then a different approach is to be utilized to detect weak signal conditions. Thus, the CPU 405 initially determines whether the video source is a digital video source or an analog video source (step 105). If the video source is a digital video source, then the method proceeds to step 110. Otherwise, the method proceeds to step 195. At step 195, a weak signal detector (not shown) is designated for use for the analog video source and then the method is terminated.

At step 110, a variable "Frame_count" is incremented. As used herein, the variable "Frame_count" provides a value that indicates the number of frames that have been counted and is utilized to detect a particular time period. In the example provided herein, the time period detected by the variable Frame_count is one (1) second for a 60 Hz input source. Of course, the time period can be varied, depending upon the input source, because the frame rate can be changed according to the input source. For example, 60 Hz material is displayed at 60 frames per second, whereas 29.97 Hz material is displayed at 29.97 frames per second. The variable Frame_count counts all of the frames but is reset to 0 at step 145, when the value of Frame_count is found equal to a reference value FRAME_PER_SEC during the comparison at step 140.

Other approaches can also be employed for detection. For example, a timer (not shown) can be employed. In such a case, the variable Frame_count would be reset to zero (0) when the timer fires and a timer interrupt can be applied every second to detect a time period of one second or one second can be counted from the timer interrupt if the timer interrupt interval is shorter than one second. The value of the variable Frame_count and the other variables used herein are stored in the memory device 410 and manipulated (e.g., decremented, incremented, etc.) by the CPU 405, both of FIG. 4.

It is to be appreciated that criteria for a weak signal condition can be evaluated with respect to the information in the Packetized Elementary Stream (PES) buffer 420 of FIG. 4, such as the PES header and data format, or the MPEG header format, and that a jump is made to error processing (see step 190 and FIG. 2) when there is a problem in these areas instead of performing valid signal processing (see step 135 and FIG. 3).

Thus, it is determined by the CPU 405 whether there is valid PES data in the PES buffer 420, by comparing pre-established criteria to the current PES data in the PES buffer 420 (step 115). If so, then the method proceeds to step 120. Otherwise, the method proceeds to step 190. At step 190, error processing is performed and the method proceeds to step 140.

At step 120, it is determined whether the PES header is valid by comparing the PES header and corresponding time stamps to pre-established criteria. If so, then the method proceeds to step 125. Otherwise, the method proceeds to step 190. At step 125, decoding of the next layer, i.e., the MPEG stream, is commenced by the video decoder 430 and the audio decoder 435. At step 130, the CPU 405 determines whether the MPEG header and data are valid. If so, then the method proceeds to step 135. Otherwise, the method proceeds to step 190. At step 135, valid signal processing is performed.

At step 140, the CPU 405 determines whether the variable Frame_count is equal to FRAME_PER_SEC. Both Frame_count and FRAME_PER_SEC can be implemented as integers, each representing a particular number of frames within a given time period. Preferably, although not necessarily, the variable Frame_count is compared to FRAME_PER_SEC at a rate of once per second. For a good signal condition, FRAME_PER_SEC represents a valid frame count, which means that all frames are valid frames. Thus, if so (i.e., if Frame_count=FRAME_PER_SEC), then the method proceeds to step 145. Otherwise, the method is terminated. At step 145,. Frame_count is reset to zero.

At step 150, the CPU 405 determines whether the variable Weak_signal_count is greater than LIMIT_FRAME_COUNT. If so, the method proceeds to step 155. Otherwise, the method is terminated. The variable "weak_signal_count" indicates the number of weak signal conditions detected within a given time period. The variable "LIMIT_FRAME_COUNT" indicates a threshold number (or count) of frames within a given time period. It is to be noted that the variables weak_signal_count and LIMIT_FRAME_COUNT can be implemented as integers. At step 155, a weak signal detect event is generated by the CPU 405, and the method is terminated.

Referring to FIG. 2, which pertains to error processing (step 190 in FIG. 1), the CPU 405 determines whether an alternate mode condition (i.e., a trick mode flag) is currently detected (step 205). If so, the subroutine proceeds to step 210. Otherwise, if a trick mode is not currently detected (i.e., the data stream is detected to be in normal mode), then the error will be attributed to a possibly weak signal and the subroutine proceeds to step 220 (where increasing the value of Weak_signal_count increases the likelihood of a weak signal event being generated).

At step 210, the variable WaitGoodSignalCount is decremented. The variable WaitGoodSignalCount can be implemented as an integer that represents a particular time period, measured in seconds, or some fraction or multiple thereof. At step 215, it is determined by the CPU 405 whether WaitGoodSignalCount is equal to zero (i.e., whether the testing window has elapsed). If so (WaitGoodSignalCount=0), then the method proceeds to step 220. Otherwise, the subroutine is terminated. At step 220, Weak_signal_count is incremented, and the subroutine is terminated.

Referring to FIG. 3, which pertains to valid signal processing (step 135 in FIG. 1), a check occurs whether trick mode is currently detected (step 305). If so, the subroutine proceeds to step 310. Otherwise, the subroutine is terminated. At step 310, the variable WaitGoodSignalCount is set to the initial value of the reference value INIT_WAIT_VALUE, and the subroutine is terminated. It is to be noted that INIT_WAIT_VALUE can be implemented as an integer that represents a particular time period, measured in seconds, or some fraction or multiple thereof. The initial value INIT_WAIT_VALUE decides the window size for detecting the next valid signal. Thus, if the data stream is in a distinctive mode such as, but not limited to, trick mode, then the count (WaitGoodSignalCount) is continually reset to avoid a false positive weak signal event. This is to be contrasted with the error processing steps (see FIG. 2), wherein WaitGoodSignalCount is decreased (step 210) and a current frame is not marked as invalid until the following conditions are met: a valid frame was previously detected and WaitGoodSignalCount reaches zero.

Although the illustrative embodiments have been described herein with reference to the accompanying drawings, it is to be understood that the present invention is not limited to those precise embodiments, and that various other changes and modifications can be affected therein by one of ordinary skill in the related art without departing from the scope or spirit of the invention. All such changes and modifications are intended to be included within the scope of the invention as defined by the appended claims.

The invention claimed is:

1. A method for detecting signal conditions for a compressed information stream, comprising the steps of:
   detecting, within a pre-defined search window, alternate-mode conditions and valid frames within the compressed information stream; and
   outputting an indication that a valid signal is detected, when an alternate-mode condition and at least one valid frame are both detected within a same one of the pre-defined search window.

2. The method of claim 1, further comprising the step of outputting another indication that an invalid signal condition is detected, when at least one of the alternate-mode condition is no longer detected and a valid frame has not been detected for a predetermined time period.

3. The method of claim 2, wherein the invalid signal condition comprises one of a weak signal condition and a no signal condition.

4. The method of claim 2, further comprising the steps of:
   detecting errors in the compressed information stream;
   detecting alternate mode conditions in the compressed information stream; and
   continuously resetting a size of the predefined search window, each time an alternate mode condition is detected without any error, to avoid a false positive indication that the invalid signal condition is detected.

5. The method of claim 1, wherein the compressed information stream is stored in a buffer, and said detecting step comprises the step of determining whether data in the buffer is valid.

6. The method of claim 1, wherein said detecting step comprises the step of determining the compressed information stream has a valid header and time stamp information.

7. The method of claim 1, wherein the compressed information stream comprises an MPEG stream and wherein said detecting step comprises the step of determining whether an MPEG header and MPEG data corresponding to the MPEG stream are valid.

8. The method of claim 7, wherein the MPEG streams are stored in a Packetized Elementary Stream (PES) buffer, and said detecting step comprises the steps of:
   determining whether PES data in the PES buffer is valid;
   determining whether Packetized Elementary Stream (PES) header and time stamp information corresponding to the MPEG streams are valid; and
   determining whether an MPEG header and MPEG data corresponding to the MPEG streams are valid.

9. The method of claim 1, further comprising the steps of:
   detecting errors in the compressed information stream;
   modifying a weak signal counter, when an error is detected in a given frame of the compressed information stream in a normal mode, the weak signal counter indicating a number of weak signal conditions detected within a given time period;
   comparing the weak signal counter to a frame count threshold, the frame count threshold indicating a total number of frames within a given time period; and
   outputting another indication that a weak signal condition is detected, when the weak signal counter is greater than the frame count threshold.

10. The method of claim 1, further comprising the steps of:
    detecting errors in the compressed information stream;
    determining whether the predefined search window has elapsed;
    modifying a weak signal counter, when an error is detected in a given frame of the compressed information stream in an alternate mode condition and the predefined search window has elapsed, the weak signal counter indicating a number of weak signal conditions detected within a given time period;
    comparing a frame count threshold to the weak signal counter, the frame count threshold indicating a total number of frames within a given time period; and
    outputting another indication that a weak signal condition is detected, when the weak signal counter is greater than the frame count threshold.

11. The method of claim 1, wherein the alternate mode condition is presented by flag a trick mode flag.

12. A method for detecting signal conditions for trick mode Motion Picture Experts Group (MPEG) streams, comprising the steps of:
    detecting, within a predefined search window, trick mode flags and valid frames within the trick mode MPEG streams; and
    outputting an indication that a valid signal is detected, when a trick mode flag and a valid frame are both detected within a same one of the predefined search window.

13. The method of claim 12, further comprising the step of outputting another indication that one of a weak signal condition and a no signal condition is detected, when at least one of the trick mode flag is no longer detected and the valid frame has not been detected for a predetermined time period.

14. An apparatus for detecting signal conditions for a compressed information stream, comprising:
    means for detecting, within a pre-defined search window, alternate-mode conditions and valid frames within the compressed information stream; and
    means for outputting an indication that a valid signal is detected, when an alternate-mode condition and at least one valid frame are both detected within a same one of the predefined search window.

15. The apparatus of claim 14, further comprising means for outputting another indication that an invalid signal condition is detected, when at least one of the alternate-mode condition is no longer detected and a valid frame, including the at least one valid frame, has not been detected for a predetermined time period.

16. The apparatus of claim 15, wherein the invalid signal condition comprises one of a weak signal condition and a no signal condition.

17. The apparatus of claim 15, further comprising:
means for detecting errors in the compressed information stream;
means for detecting alternate modes of the compressed information stream; and
means for continuously resetting a size of the predefined search window, each time an alternate mode condition of the compressed information stream is detected without any error, to avoid a false positive indication that the invalid signal condition is detected.

18. The apparatus of claim 14, wherein the compressed information stream is stored in a buffer, and said means for detecting comprises means for determining whether data in the buffer is valid.

19. The apparatus of claim 14, wherein said means for detecting comprises means for determining whether the compressed information stream contains valid header and time stamp information.

20. The apparatus of claim 14, wherein said means for detecting comprises means for determining whether a header and data corresponding to the compressed information stream are valid.

21. The apparatus of claim 14, wherein the compressed information stream is stored in a buffer, and said means for detecting comprises:
means for determining whether data in the buffer is valid;
means for determining whether header and time stamp information corresponding to the compressed information stream are valid; and
means for determining whether an header and data corresponding to the compressed information stream are valid.

22. The apparatus of claim 14, further comprising:
means for detecting errors in the compressed information stream;
means for modifying a weak signal counter, when an error is detected in a given frame of the compressed information stream in a normal mode, the weak signal counter indicating a number of weak signal conditions detected within a given time period;
means for comparing the weak signal counter to a frame count threshold, the frame count threshold indicating a total number of frames within a given time period; and
means for outputting another indication that a weak signal condition is detected, when the weak signal counter is greater than the frame count threshold.

23. The apparatus of claim 14, further comprising:
means for detecting errors in the compressed information stream;
means for determining whether the predefined search window has elapsed;
means for modifying a weak signal counter, when an error is detected in a given frame of the compressed information in an alternate mode condition and the predefined search window has elapsed, the weak signal counter indicating a number of weak signal conditions detected within a given time period;
means for comparing a frame count threshold to the weak signal counter, the frame count threshold indicating a total number of frames within a given time period; and
means for outputting another indication that a weak signal condition is detected, when the weak signal counter is greater than the frame count threshold.

24. The apparatus of claim 14, wherein the alternate mode condition is represented by a trick mode flag.

* * * * *